May 8, 1928. 1,669,105

M. M. TENESCH

MAIN AND MIDDLE CONNECTION BEARING FOR LOCOMOTIVES

Filed April 13, 1927

Inventor
Max M. Tenesch.
by Hazard and Miller
Attorney.

Patented May 8, 1928.

1,669,105

UNITED STATES PATENT OFFICE.

MAX M. TENESCH, OF LAS VEGAS, NEVADA.

MAIN AND MIDDLE CONNECTION BEARING FOR LOCOMOTIVES.

Application filed April 13, 1927. Serial No. 183,402.

My invention is a main and middle connection bearing for locomotives forming the pin connection from the main connecting rod to one of the driving wheels of the locomotive.

Objections have been found to the ordinary pin connection on the drive wheel of a locomotive to which the connecting rod is attached and to which the other drive wheels are coupled by links, as the pin is subjected to such great stresses that it wears comparatively rapidly and in some cases is slightly bent. Moreover when the pin becomes worn the initial pull or thrust of the connection rod, which through the medium of the cross head and the piston rod receives the direct force of the steam in the cylinder, allows a slight play or a pounding action. If there is lost motion between the pins and the links connecting with other drivers, this also gives place to lost motion allowing the main driving wheel to have a slight rotation relative to the other driving wheels, whereas they should all rotate simultaneously.

An object of my invention is the construction of a combined pin and bearing so that the force transmitted by the connecting rod from the cross head is transmitted through a bearing structure to the various drive wheels other than that to which the pin is connected, the connecting rod transmitting driving force to this latter driving wheel.

In constructing my invention I secure a pin to the main driving wheel and on this pin I mount a sleeve which is tightly fitted in a bearing member. This bearing member may be connected by a link to the front driving wheel, where the pin is in the second driving wheel, and a solid connection may be utilized in the bearing to the third driving wheel. The connecting rod is journaled on the sleeve and the bearing has an arm or yoke whereby the main part of the bearing is secured to both the inner part and the outer part of the pin and the sleeve so that the driving force from the connecting rod is to a great extent transmitted directly through the sleeve to the bearing and hence to the various driving wheels.

My invention will be more readily understood from the following description and drawings, in which.

Figure 1:
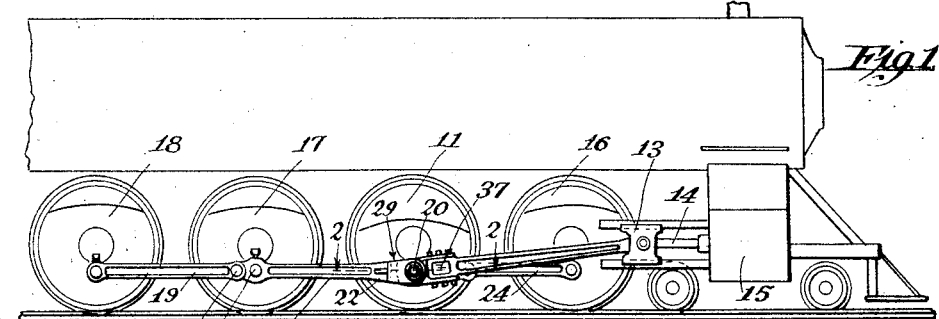
Figure 1 is a side elevation of a locomotive showing my bearing connected thereto.

In the drawings the main driving wheel is designated by the numeral 11, this being driven by the connecting rod 12 which is pivoted to the cross head 13 and the cross head being actuated by a piston rod 14 operating on the piston in the cylinder 15. The front driving wheel 16 and the third driving wheel 17 are directly coupled to the main driving wheel 11 and the rear driving wheel 18 is coupled to the third driving wheel by the link 19.

Figure 2:
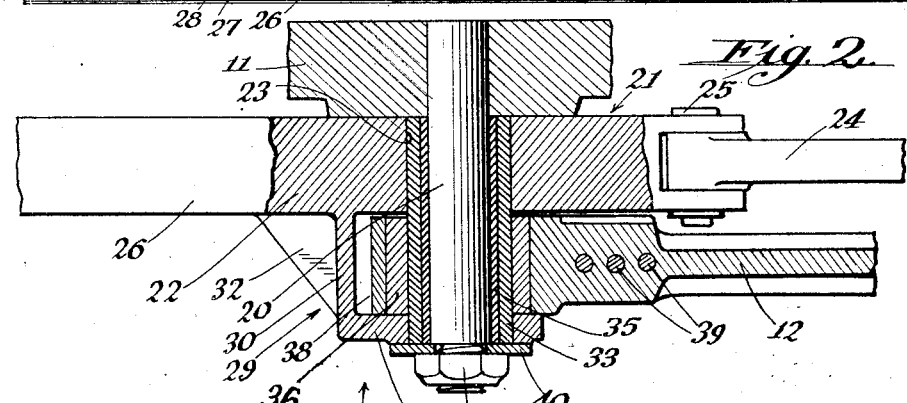
Figure 2 is an enlarged horizontal section on the line 2—2 of Fig. 1 in the direction of the arrows, with certain of the parts being shown in plan.
Figure 3:
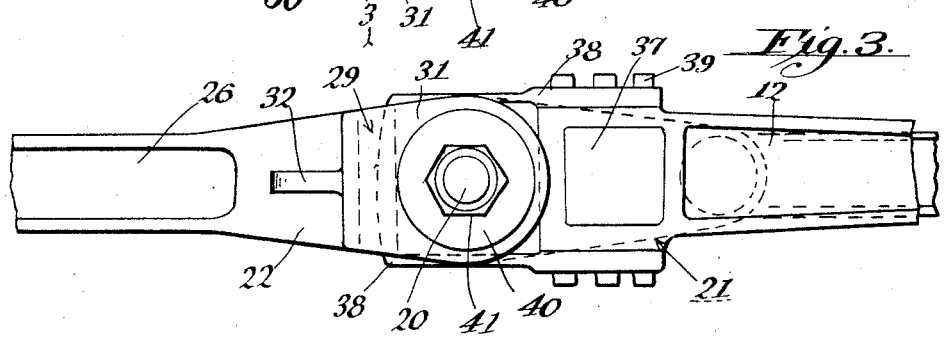
Figure 3 is a side elevation taken in the direction of the arrow 3 of Fig. 2.
Figure 4:
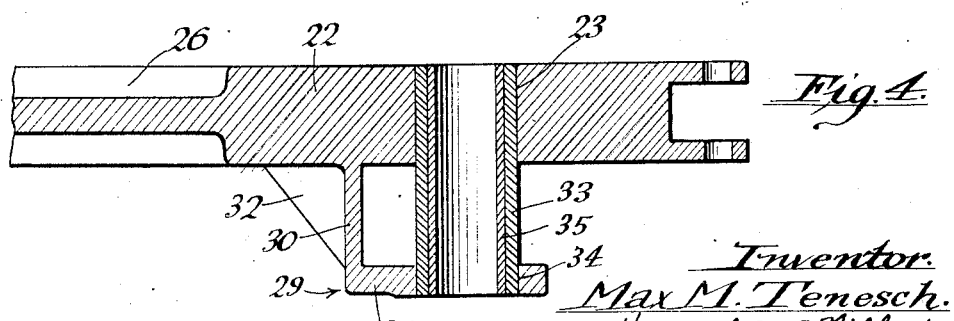
Figure 4 is a section similar to Fig. 2, showing the bearing member and the sleeve associated therewith separate from the other parts.

The details of my invention are substantially as follows, having reference particularly to Figs. 2, 3 and 4:

A substantial pin 20 is secured in the usual manner in the body of the main driving wheel 11. On this pin is mounted a bearing member, designated generally by the numeral 21, this bearing member having a longitudinal bar section 22 with a cylindrical opening 23 therein. The front end is connected to the link 24 by a pin connection 25. The rear end 26 is preferably solid and leads directly to the pin 27 on the third driving wheel 17. This bar extension leads past the pin 27 and by means of the pin 28 connects to the link 19. The links 19 and 24 are attached to the fourth and first driving wheels in the usual manner and it is to be understood that a lesser or greater number of driving wheels may be utilized in my construction.

A yoke member 29 extends laterally from the main bar 22, having a rearward supporting section 30 and a flange section 31 parallel to the bar 22, there being preferably a reinforcing web 32 at the back of the rear supporting section 30. A substantial sleeve 33 has a tight fit in the main portion of the bar, fitting in the opening 23, an opening 34, and the flange 31 of the yoke, and inside this sleeve there is an antifriction bearing sleeve 35.

The main connecting rod 12 has a bushing 36 therein, the head or large end 37 of this connecting rod being connected to the sleeve 33, there being a strap 38 extending around the bushing 36 and being secured by bolts 39 or the like to such large end 37 of the connecting rod. This connection fits between the flange 31 and the main portion of the bar 22. A washer 40 and a nut 41 are used to secure the bearing element and the large end of the connecting rod to the pin 20.

The manner of operation and functioning of my connection and bearing is substantially as follows:

When force is transmitted to the connecting rod 12, either by a pull or a push on such rod, such force is transmitted to the sleeve 33 and by such sleeve transmitted to the bearing bar 22 and to the flange 31 of the yoke 29, this yoke being connected to the bar 22.

Thus the stresses which are brought to bear on the sleeve 33 being directly transmitted to the bar 22 convey such stresses through the link 24, by means of the pin 25, to the front driving wheel 16; and by means of the solid extension rearwardly of the main portion of the bar the driving force is transmitted to the third driving wheel. The main pin 20 is not called upon to withstand substantially this great bending or shearing force but is employed to transmit motion from the large end of the connecting rod 12 and from the bearing and yoke to the main driving wheel 11.

It will therefore be seen that this main pin 20 functions considerably different from the pin utilized in the old construction as it is not called upon to convey both the forces of the main connecting rod and the stresses of the links to the front and rear driving wheels but these stresses in my construction to the front and rear driving wheels are conveyed directly to the bar 22, the pin 20 of course acting as a guiding or centering medium in the transmission of this force.

Various changes may be made in the principles of my invention without departing from the spirit thereof, as set forth in the description, drawings and claims.

I claim:

1. In the art described the combination of a locomotive driving wheel having a pin connected thereto, a bearing member having a bearing sleeve fitted therein, the sleeve being journaled on the pin, means interconnecting the bearing member with adjacent driving wheels, and a connecting rod having a bearing on the said sleeve.

2. In the art described the combination of a locomotive driving wheel having a pin, a bearing member having a bearing sleeve therein, the sleeve being journaled on the pin, one end of said bearing member being directly connected to an adjacent driving wheel, and a connecting rod journaled on the said sleeve.

3. In the art described the combination of a locomotive driving wheel having a pin secured thereto, a bearing member having a bearing sleeve, the sleeve being journaled on the pin, a yoke extending laterally from the main body of the bearing member and engaging the sleeve, means interconnecting the bearing member and an adjacent driving wheel, and a connecting rod connected to the sleeve between the main body of the bearing member and the yoke.

4. In the art described the combination of a locomotive driving wheel having a pin connected thereto, a bearing member having a lateraly extending yoke, means forming a journal connection of said bearing member and yoke on the pin, a connecting rod journaled on said journal forming means between the main body of the bearing member and the yoke, and means to connect the bearing member to an adjacent driving wheel.

5. In the art described the combination of a locomotive driving wheel having a pin connected thereto, a bearing member in the form of a bar having a laterally extending yoke with a flange parallel to the said bar, a bearing sleeve secured to the bar structure and to the flange, the bar having an extension connected to an adjacent driving wheel by a pin, a connecting rod coupled to a cylinder, the connecting rod being journaled on the said sleeve between the bar structure and the flange.

6. In the art described the combination of a locomotive driving wheel having a pin connected thereto, a bearing member having a bearing sleeve journaled on the pin, a yoke extending laterally from the main body of the bearing member and having a flange section parallel thereto, the flange section engaging the sleeve, the bearing member having an extension connected to an adjacent driving wheel by a pin, a link connected to another part of the bearing member and to another driving wheel, and a connecting rod journaled on the sleeve between the flange of the yoke and the main body of the bearing member.

In testimony whereof I have signed my name to this specification.

MAX M. TENESCH.